United States Patent
Jaspersohn et al.

(10) Patent No.: US 8,203,594 B2
(45) Date of Patent: Jun. 19, 2012

(54) FALLBACK MOBILE COMMUNICATION

(75) Inventors: Gary Jaspersohn, Norwood, MA (US); Rupa Rao, Bangalore (IN); Michael Katz, Westford, MA (US); Anupama Hegde, Bangalore (IN); Jawad Ayaz, Bangalore (IN)

(73) Assignee: LiveWire Mobile, Inc., Littleton, MA (US)

( * ) Notice: Subject to any disclaimer, the term of this patent is extended or adjusted under 35 U.S.C. 154(b) by 1316 days.

(21) Appl. No.: 11/853,345

(22) Filed: Sep. 11, 2007

(65) Prior Publication Data

US 2008/0062253 A1 Mar. 13, 2008

Related U.S. Application Data

(60) Provisional application No. 60/844,058, filed on Sep. 11, 2006.

(51) Int. Cl.
*H04N 7/14* (2006.01)
(52) U.S. Cl. .................. 348/14.11; 348/14.01
(58) Field of Classification Search .... 348/14.01–14.16; 455/422, 67.11, 436; 725/106, 131, 117, 725/119; 370/440
See application file for complete search history.

(56) References Cited

U.S. PATENT DOCUMENTS

| 7,031,441 | B1* | 4/2006 | Edwards et al. | 379/88.17 |
| 2003/0046705 | A1* | 3/2003 | Sears | 725/106 |
| 2005/0064821 | A1* | 3/2005 | Hedberg et al. | 455/67.11 |

OTHER PUBLICATIONS

International Search Report mailed Oct. 17, 2008 in counterpart International Application No. PCT/US07/78143.

* cited by examiner

*Primary Examiner* — Melur Ramakrishnaiah
(74) *Attorney, Agent, or Firm* — Chapin IP Law, LLC

(57) ABSTRACT

Conventional video call attempts encountering a device inoperable according to a desired capability will fail if the receiving device is unable to complete the call at the desired service level (i.e. video). In addition to frustrating the communication attempts between users, another issue is that resources consumed in the attempted but failed exchange are not recoverable, since the call never completed. Accordingly, configurations herein substantially overcome such shortcomings by providing a fallback mechanism that identifies a service level operable by both the initiating device and the receiving device, and completes the call at a lower service level operable by both devices. The disclosed approach allows a call to complete at an alternate service level (i.e. voice instead of video) rather than failing the call completely, resulting in a source of lost revenue to the service provider (operator).

22 Claims, 7 Drawing Sheets

FALLBACK MOBILE COMMUNICATION

CLAIM TO BENEFIT OF EARLIER FILED PATENT APPLICATIONS

This invention claims the benefit under 35 U.S.C. 119(e) of the filing date and disclosure contained in Provisional Patent Application having U.S. Ser. No. 60/844,058, filed, Sep. 11, 2006, entitled "FALLBACK VIDEO COMMUNICATION", incorporated herein by reference.

BACKGROUND

In a media telecommunications environment, users subscribe to a service provider for telecommunications services. The telecommunications services may include a range of capabilities, including simple voice (telephone), voice mail, audio (i.e. music) downloads, email, text messaging (texting), video calling, video mail, and Internet access, to name several. The user, or subscriber, employs a personal communications device such as a cell phone, PDA or other personal computing device operable to provide the services subscribed to. Often such services entail communications to another subscriber. The other subscriber employs a similar device operable for the service to be employed, such as voice, text or video, for example.

From time to time, the service providers enhance their service offerings with new and/or improved services, to keep pace with technology and marketing trends. As is often the case with new technology, an initial release of functionality may take some time to establish a substantial user base. In the case of interactive operations between subscribers (i.e. services between two or more users), both users employ a device operable according to the service to be employed.

When new communications services are launched, so called "network effects" frequently limit the early adoption of the service. The problem is the new service requires new terminal devices and/or new facilities in the network. Until there is a critical mass of enabled users, i.e. a "network" of users, the early adopters have few people to communicate with and there is little incentive for others to adopt the devices or use the new service. This is particularly a problem with video communications services today, but is a general problem with any new communication service.

SUMMARY

New and/or enhanced telecommunications capability may suffer from the shortcoming that widespread usage may not be achieved until a substantial user base has devices conversant in the new capability. Configurations disclosed herein are based, in part, on the observation that conventional communications attempts to employ new capabilities or services may fail if both devices are not operable according to the new capability or service. For example, conventional video calls (video telephony and/or video sharing) calls will fail if an initiating device makes a call to a receiving device that does not have video capability.

Accordingly, conventional approaches to communication services suffer from the shortcoming that call attempts encountering a device inoperable according to a desired capability (i.e. a video call) will fail if the receiving device is unable to complete the call at the desired service level. In addition to frustrating the communication attempts between users, another issue is that resources consumed in the attempted but failed exchange are not recoverable, since the call never completed. Therefore, configurations herein substantially overcome such shortcomings by providing a fallback mechanism that recognizes a call about to fail, identifies a service level operable by both the initiating device and the receiving device, and completes the call at a lower service level operable by both devices. The disclosed approach allows a call to complete at an alternate service level (i.e. voice instead of video) rather than failing the call completely, resulting in a source of lost revenue to the service provider (operator).

Configurations disclosed herein include a strategy for solving the general problem, solutions for various types of multimedia communications and specific embodiments for typical forms of video communications being offered by mobile operators. Video calling and content-based services such as MobileTV are key applications identified by operators. So called 3G-324M circuit-switched video telephony and packet-based video sharing, by itself or combined with a circuit-switched call, have been deployed or are in trials across operator networks. However, in the absence of mass-market penetration of handsets which are video call enabled or video share enabled, the adoption of video communication may be prolonged. As a result, some operators are promoting content-based video services rather than video communication, and some are offering PC-based video clients to their customers to increase the community of video-enabled users.

Such 3G video telephony is based on the 3G-324M standard, which provides a full-duplex video & audio connection between two parties over a circuit-switched data path. 3G video sharing provides one-way video transmission over an IP data connection, with or without an associated circuit-switched voice call. Video sharing can be one-to-one or one-to-many. In addition to mobile video services, other video telephony systems are available, based on H.320, H.323, MGCP, MEGACO, SIP and other standard and proprietary schemes.

With any new service such as 3G video telephony or 3G video sharing, new subscribers have a problem, as relatively few people have handsets capable of receiving a video call. In addition, it's frequently impossible to know in advance if the called party can receive the call. And, after placing a video call or initiating video sharing, it can take 5-10 seconds or more before the calling party finds out whether the connection is going to complete.

Many of today's video communications services include video mail, but video mail only provides call completion for called parties who already have the appropriate video terminal and video service. In addition, video mail doesn't always work if the called party is roaming on other networks and not all video subscribers also subscribe to video mail. Video store and forward services exist, particularly for content delivery. However, conventional approaches do not address the problem of video call completion when the called party does not have an appropriate terminal or an appropriate service to support video communication.

Both the Fallback Video Telephony and the Fallback Video Sharing operate by automatically recognizing a video session that is not going to be successful. The fallback application intercepts the call attempt, buffers the video if necessary, and then uses alternate means to deliver the caller's video, thus using a mechanism that covers a much larger proportion of the population. Depending upon the receiving party's capabilities, the caller's video is provided in near real-time or is made available for later viewing using one or more of the following techniques: via an SMS message that includes a URL or other link to where the video is available for streaming or download, via streaming video or progressive download over GPRS, EDGE, 3G or other Internet connection; video delivered as an MMS message; video delivered to a 3G-324M handset; video delivered to a Web browser, WAP browser or FTP client (fixed or mobile), or to an instant messaging client, either by streaming, as a file or as a link to a file, video files or links delivered as email, or other suitable method. As a final fallback for multimedia adaptation, it is possible to provide sequences of still images at rates of a few images per second down to one to several seconds per image for those with still image but no video capabilities. These images can be delivered to the called party directly or indirectly by any of the means discussed above. The ultimate fallback for notification is to place a voice call to the called party and have an interactive voice response (IVR) system verbally alert the called party to the existence of a video for them, explain delivery alternatives and solicit their input on how to proceed.

Configurations herein benefit the video subscriber who has signed up for, and is paying for, video services because it greatly increases the likelihood their video will get to the intended party. It also represents an excellent opportunity to sell video products and services to non-subscribers, as the receiving party has received a video from a mobile subscriber and is thus aware of the service and more likely to respond to targeted marketing.

Other feature of the claimed approach include:

1. Service-specific means to recognize a video call or video share that would otherwise fail and re-route it to a Video Telephony Service Node (VTSN).

2. Means to establish called-party capabilities, by lookup (typically for an operator's own subscribers) and by rule for other called parties.

3. Terminating the initial video call or video share at the VTSN, including negotiating video capabilities with the calling party. The negotiation can be arranged to maximize video quality, or to minimize any subsequent video transcoding and/or translating that may be required, based on the called party's video capabilities.

4. Means (within the VTSN) to buffer, transcode and/or rate-adapt the video material between the calling party's negotiated format and the called party's capabilities.

5. Means, either within the VTSN or by linking to a video mail system or other video storage system like the NMS MobilePlace content locker, to store video for later replay in any of the supported formats.

6. Means to extract a sequence of still images from the original video for those clients that can view images but have no video capability of any kind.

7. Means to deliver video and/or a sequence of still images using any of the following technologies: streaming video over GPRS, EDGE or 3G; video delivered as an MMS message; video delivered to a 3G-324 handset; video delivered to a Web or WAP browser, or an instant messaging client, either by streaming or as a file; video files delivered as email; or sequences of still images at rates between one to a few images per second and one to several seconds per image.

8. An interactive voice response (IVR) system arranged to place a voice call to an otherwise video-unreachable called party, which uses IVR to alert the called party to the availability of video content intended for them and to solicit information on how to deliver the content.

9. A database of called parties indicating which alternate delivery means have worked, which didn't, how much time delay was involved in the delivery and other details including dates, times and results of delivery attempts.

10. A direct marketing system that leverages our knowledge of called party capabilities to implement targeted marketing campaigns that promote relevant products and services to people with whom the fallback video communications system has interacted.

For 3G-324M video calls, use IN approaches to recognize a call that will fail or has failed and divert it to the VTSN. For on-net calls, the called party's capabilities can be determined from the HLR or HSS or other operator database during the database dip that determines their current status and location. If the called party does not subscribe to the appropriate video service, the original call is diverted to the VTSN. For off-net 3G-324M calls, 3G-324M-specific ISDN bearer elements are passed in the ISUP IAM message. If the call fails, the distant party release message will include a cause, for example, bearer service not supported. If so, divert the call to the VTSN or other suitable device responsive to the indication of a device mismatch (i.e. non-video supporting device, in the example shown). For 3G video sharing attempts, the network's SIP proxy or 3G CSCF maintains or has access to registration and routing information. For on-net calls, in addition to routing info, the called parties capabilities can also be determined from registration information (i.e. whether video capable) or through capability exchange preceding/during call setup. For off-net calls the SIP session is routed to the Proxy that the called party is anchored to. When an SIP Video Session initiation request is received by the SIP Proxy or CSCF, it performs a database query to determine:

a) whether the session could be routed to the called party b) if (a) is true, whether the called party is video capable If check on either (a) or (b) returns failure for on-net calls, the SIP Proxy or CSCF diverts the session to the VTSN. Similarly, in the case of off-net calls, if no route exists to the called party, the SIP Proxy or CSCF diverts the session to the VTSN. Even upon successful routing, for both on-net and off-net calls, the session setup could fail due to incompatible video capabilities between the calling and called party—on session setup failure, the SIP Proxy or CSCF diverts the session to the VTSN. Session setup may also fail due to the called party being busy, unreachable, not answering or rejecting the Video Share Session, which would also result in the session being directed to VTSN.

If the called party is off-net, we can use rules to make an educated guess as to their video capabilities. If they are in a country where mobile numbers have distinct prefixes, for example in any country with "calling party pays," then mobile phones can be assumed to have SMS capability and the system may offer (via SMS) a choice of getting the video content via the Web, WAP or MMS.

In a typical deployment, video will be buffered in whatever format is available from the calling party's handset or video terminal. Video will then be transcoded and/or rate adapted zero, one or more times to provide versions appropriate for each of the alternative delivery methods. This can be done after the video has been recorded or can be done in real time as the video is being recorded. If near real time delivery is an option, then any required transcoding or rate adaptation is done in real time as well.

Many of the features of fallback video communications can be realized by client software on individual handsets or other video terminals or video terminal software for PCs, in cooperation with a relatively few network-based elements. For example, with adequate on-device storage, terminal software can buffer video and, upon failure of the initial call, attempt alternate delivery methods. These could be direct from the terminal and/or could involve transferring the buffered video content to a network-based server for later download after the called party receives an email, SMS, IM or other message from the calling party's terminal software. Similarly, client software can request alternate delivery information from a network element and can post alternate delivery results to a network element that is part of, or is connected with, a network-based targeted marketing system.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The disclosed method and apparatus for providing fallback video communication completes a video communication that otherwise would have failed. It works for typical forms of video communication and acts to deliver the calling party's video content to the called party, as rapidly as possible, using one or multiple alternate means. In addition, the mechanism accumulates information on called party capabilities, so as to simplify and/or improve delivery of future communications and to target appropriate marketing messages, e.g. messages promoting video equipment and services.

Configurations discussed below therefore identify video communications that have failed or will fail, for example because the called user is not video capable, not reachable, busy or not answering, and divert such communications attempts to a fallback server system that can terminate the call (compete the connection attempt) and buffer the video. The mechanism buffers the video and/or multimedia content as required, and determines an appropriate alternate delivery means, either the one best means or multiple means to be attempted in parallel or in sequentially.

Figure 1:
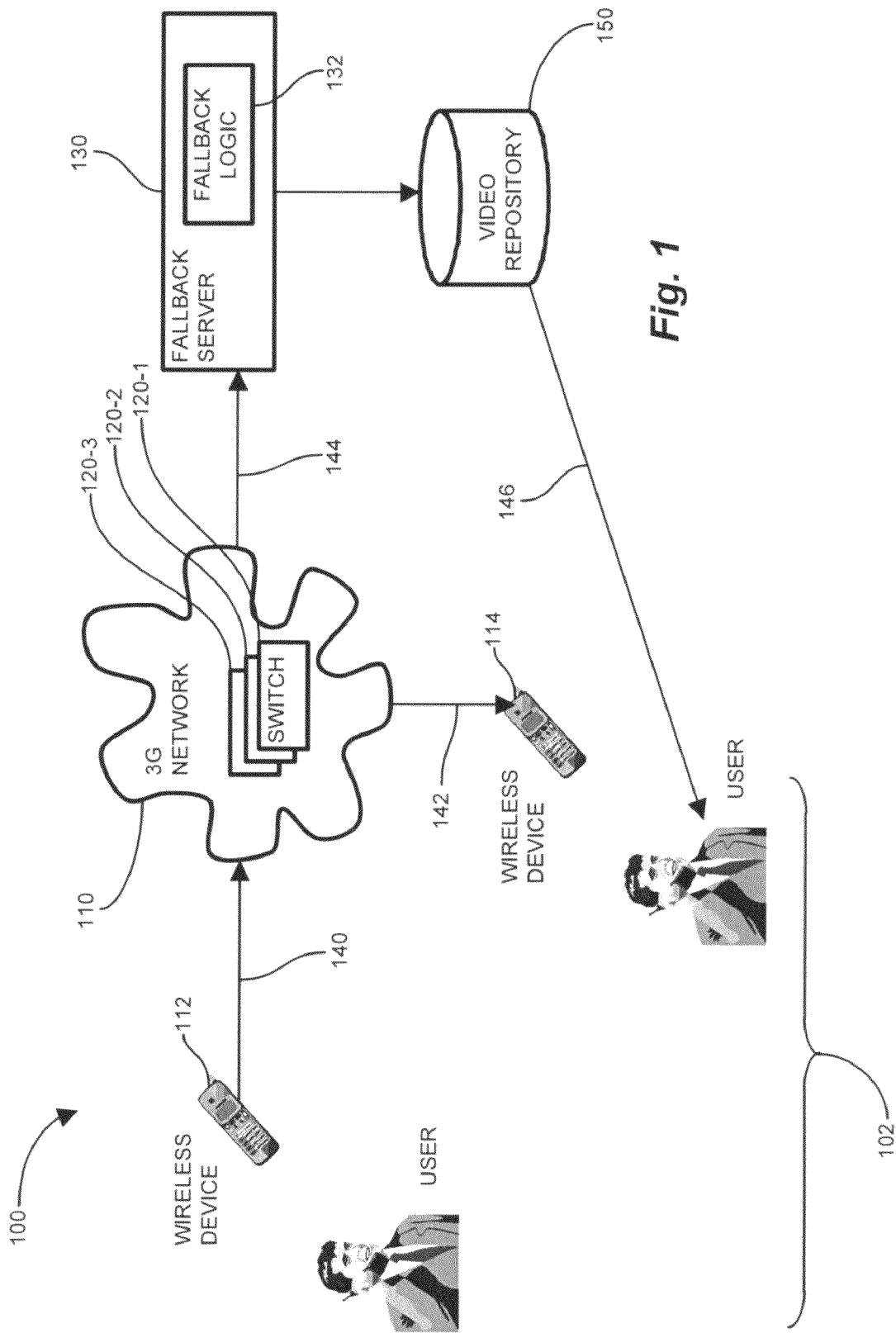
FIG. 1 is a context diagram of an exemplary video telephony environment having personal communications devices suitable for use with the present invention.

FIG. 1 is a context diagram of an exemplary video telephony environment having personal communications devices suitable for use with the present invention. Referring to FIG. 1, a video telephony environment 100 includes a network 110, such as a 3G network operable for multimedia transport. The network 110 supports a multitude of communication devices 102, such as an initiating communication device 112 and a recipient communication device 114. In a conventional scenario, the initiating device 112 calls the recipient communication device 114 to allow the devices 102 to complete a call connection and allow the devices to communicate. With the advent of so called 2.5G and 3G networks, however, the initiating communication device 112 and recipient communication device 114 may not be similarly equipped, and thus have different capability features. Thus, a call initiated at an expected service level, such as video telephony, may not be able to complete if the recipient device has only capability features to support a voice service level.

Accordingly, a switch 120-1 . . . 120-3 (120 generally) in the network detects when a call is about to fail due to equipment mismatch, and reroutes the call to a fallback server 130 for resolution. In the example case of a video telephony call or shared video call, the fallback server 130 bifurcates, or separates the audio 142 and video 144 components of the call 140. The audio component 142 is allowed to continue unhindered between the communication devices 112, 114. The video component 144, however, is intercepted by the fallback server and stored in a video repository 150 for later delivery to the non-video conversant recipient device 114. The fallback server 130 examines the capability features of the recipient device 114 and determines an optimal mitigating medium by which the intercepted video 144 may be delivered. Subsequent to the call, the fallback server 130 transports the captured video 146 from the video repository 150 to the recipient device 114, such as by a subsequent video stream, email of a video file (.flv or other), or simply a voice or text indication of an external web server via which the intercepted video component 146 may be viewed, discussed further below.

Therefore, fallback video communications ensures the majority of attempted video calls result in video communication with the intended party. The mechanism intercepts video calls that would not be successful because the called party is not capable, not reachable, busy or not answering. It buffers the video as required and uses alternate means to deliver the video content to the called user. This enables video communication for a larger proportion of the population.

In the case of called party not reachable and busy, the fallback solution doubles as a video mail service with the difference that the called user does not have to sign up for video mail service and does not have to explicitly retrieve the video mail if MMS or email forwarding is enabled.

If an SMS, IM or email, with a RTSP link, is sent to the called party, the video can be streamed to the called party in near-realtime. Potential called parties are not limited to those with 3G video-enabled mobile handsets and could include PCs with instant messaging, email, RTSP or browser clients, for example. Also, fallback video communication ensures that user-to-user video communication is possible with communication endpoints that have only basic capabilities. Fallback Video Telephony and Fallback Video Share are typical example embodiments for the two most common forms of mobile video communications that provide user-to-user video services; configurations herein are operable for other suitable communication device mismatches and for avoiding call failure thereto.

Figure 2:
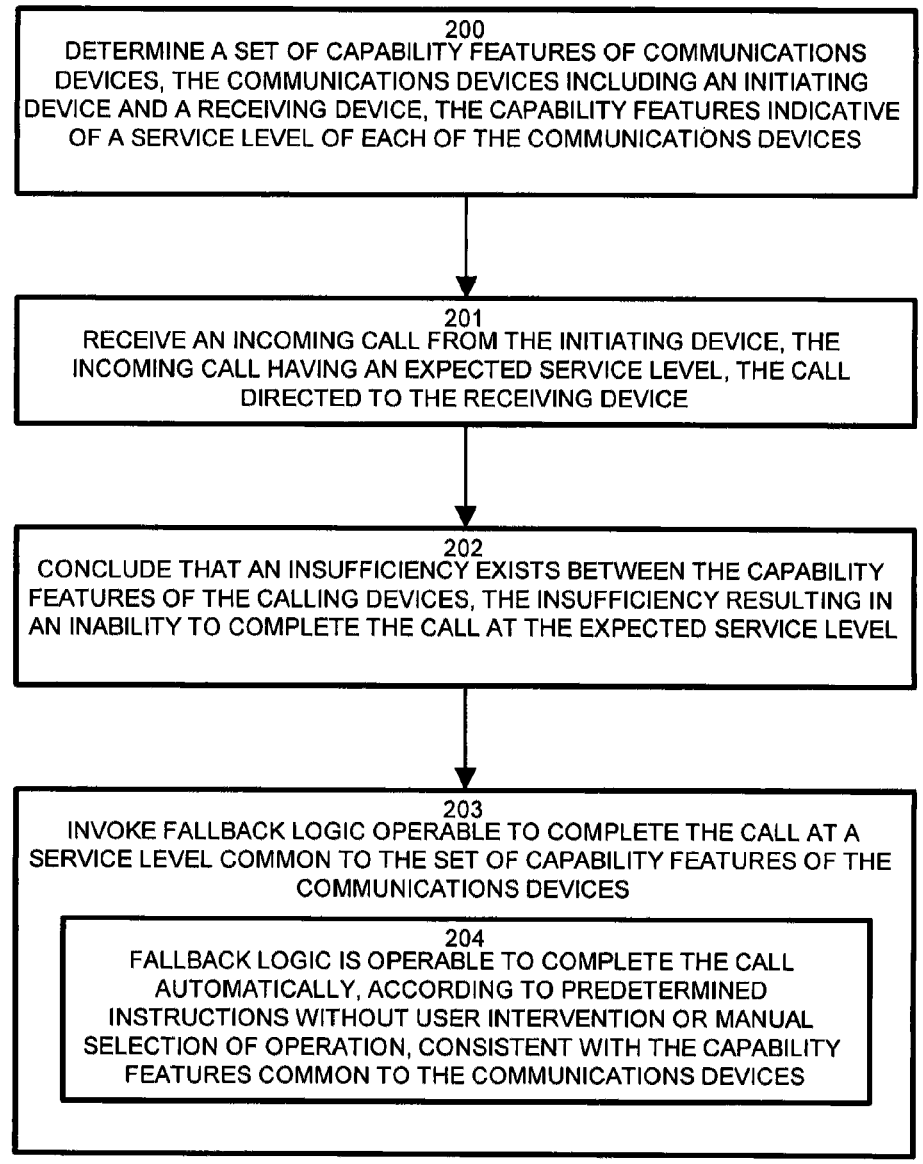
FIG. 2 is a flowchart of fallback processing in the environment of FIG. 1.

FIG. 2 is a flowchart of fallback processing in the environment of FIG. 1. Referring to FIG. 1, the method of fallback processing for avoiding call failure disclosed herein include, at step 200, determining a set of capability features of communications devices 102, the communications devices including an initiating device 112 and a receiving device 114, such that the capability features are indicative of a service level of each of the communications devices. The network 110 receives an incoming call 140 from the initiating device 112, in which the incoming call has an expected service level, and the call being directed to the receiving device 114, as depicted at step 201. The service level is typically based on the capabilities or expectations of the initiating device 112, thus ripening the possibility of capability mismatch. The network 110, via an array of switches and routing devices 120, concludes that an insufficiency exists between the capability features of the calling devices 102, in which the insufficiency results in an inability to complete the call at the expected service level, as disclosed at step 202. The network 110, via a predetermined trigger or proxy at one of the switches 120 (discussed further below), invokes fallback logic 132 in the fallback device operable to complete the call at a service level common to the set of capability features of the communications devices, as disclosed at step 203. In the example configuration, the fallback logic 132 is operable to complete the call automatically, according to predetermined instructions, without user intervention or manual selection of operation, in a manner consistent with the capability features common to the communications devices, as depicted at step 204.

Figure 3:
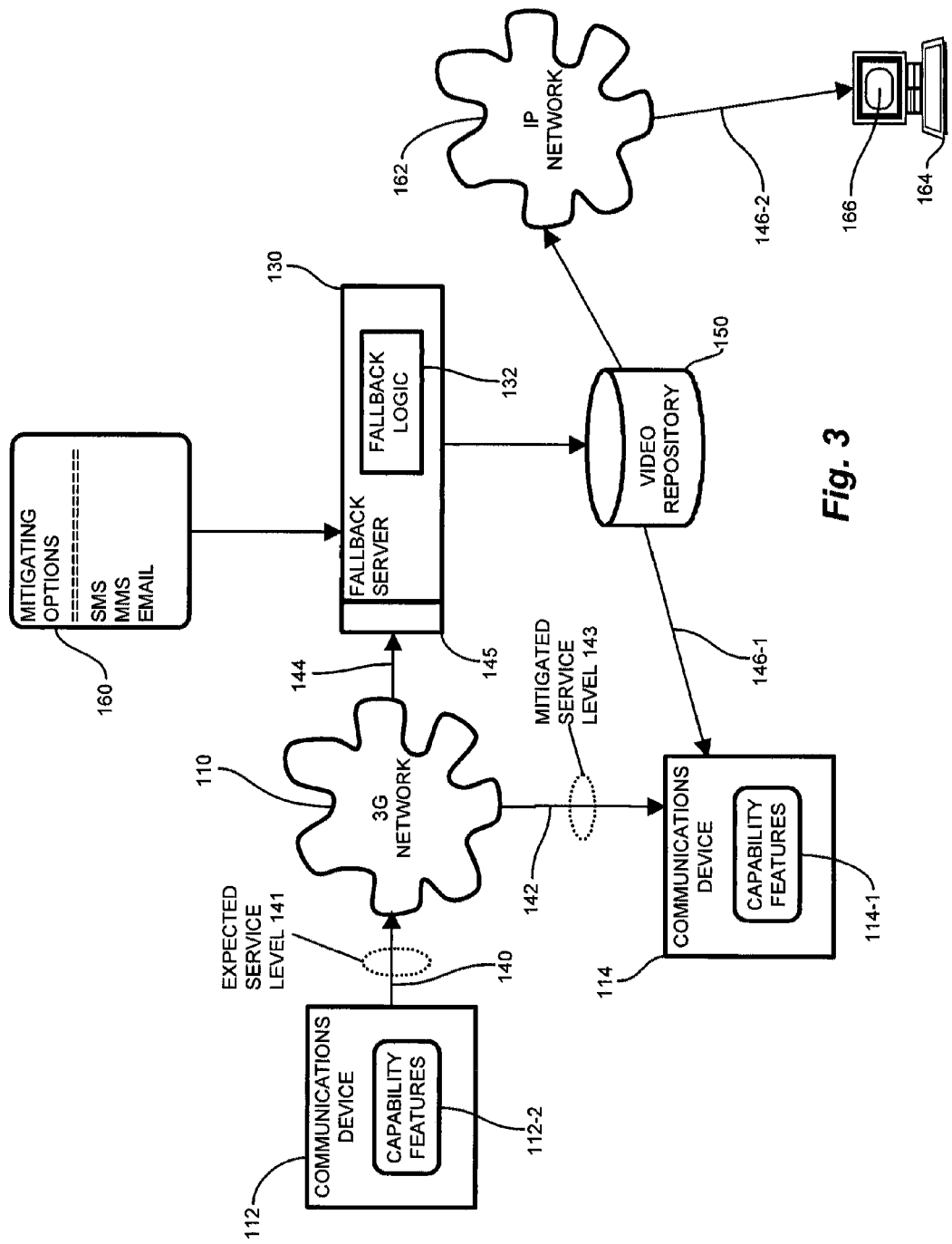
FIG. 3 is a block diagram of video call fallback processing in the environment of FIG. 1.

FIG. 3 is a block diagram of video call fallback processing in the environment of FIG. 1. Referring to FIG. 3, the initiating device 112 includes capability features 112-1 for carrying on a call 140 to a recipient device 114, also including capability features 114-1, at an expected service level. The fallback logic 132 includes an interface 145 to the network 110 for establishing interception of a potentially failed call 140, such as a so-called trigger or set proxy, as is known in the art. The intercepted call 140 is bifurcated into audio components 142 and video components 144. The intercepted call 140 is rerouted such that the fallback logic 132 buffers, caches, or otherwise stores the video component 144 in the video repository 150, and subsequently delivers it to the recipient device 114 by a suitable mitigating option 160, such as via a separate email or other communication 146-1 directly to the device 114, or indirectly via an IP network 162 to an alternate browser 166 device 164.

Figure 4:
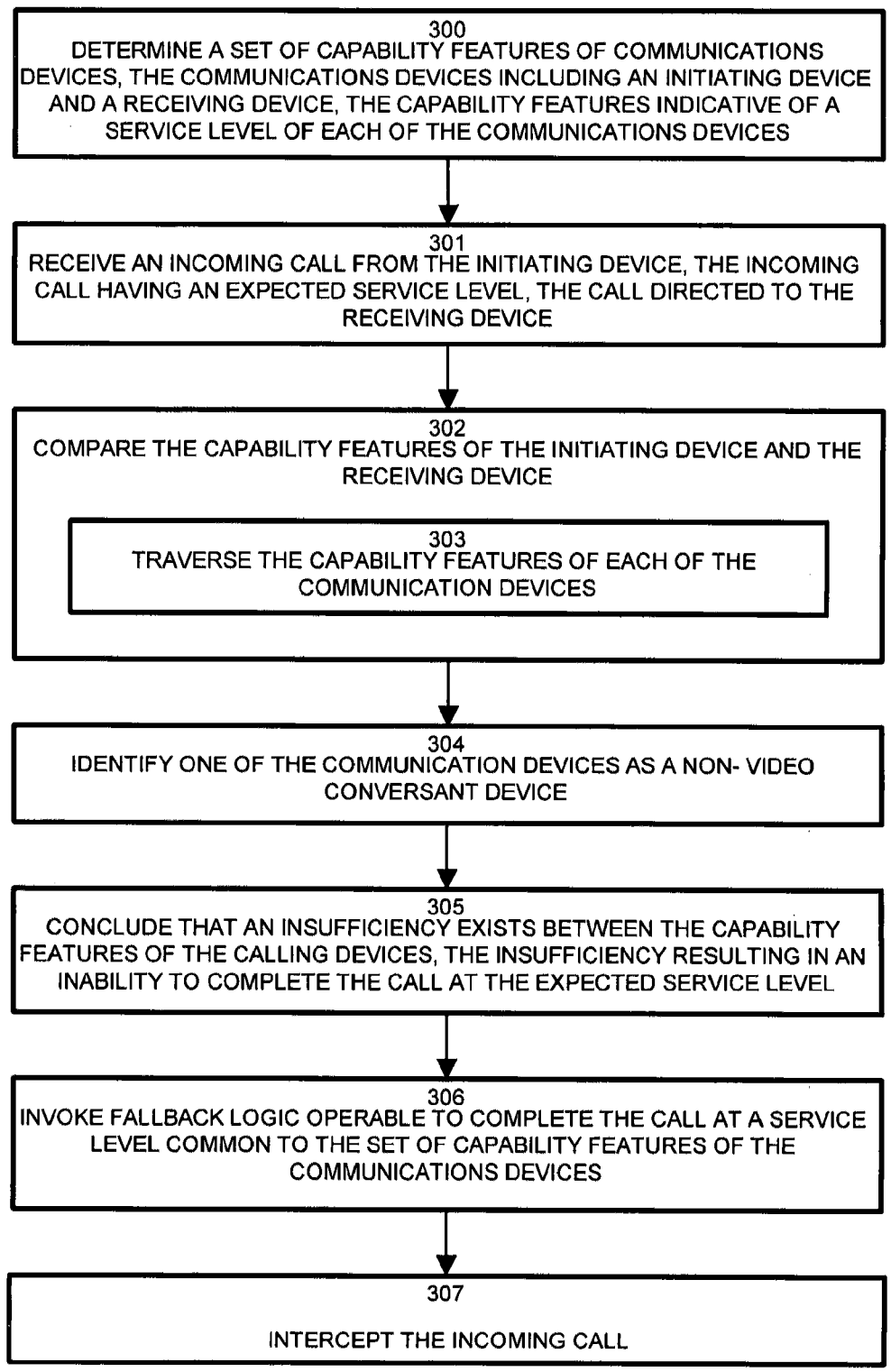
FIGS. 4-7 are a flowchart of video call fallback processing according to the diagram of FIG. 3.
Figure 5:
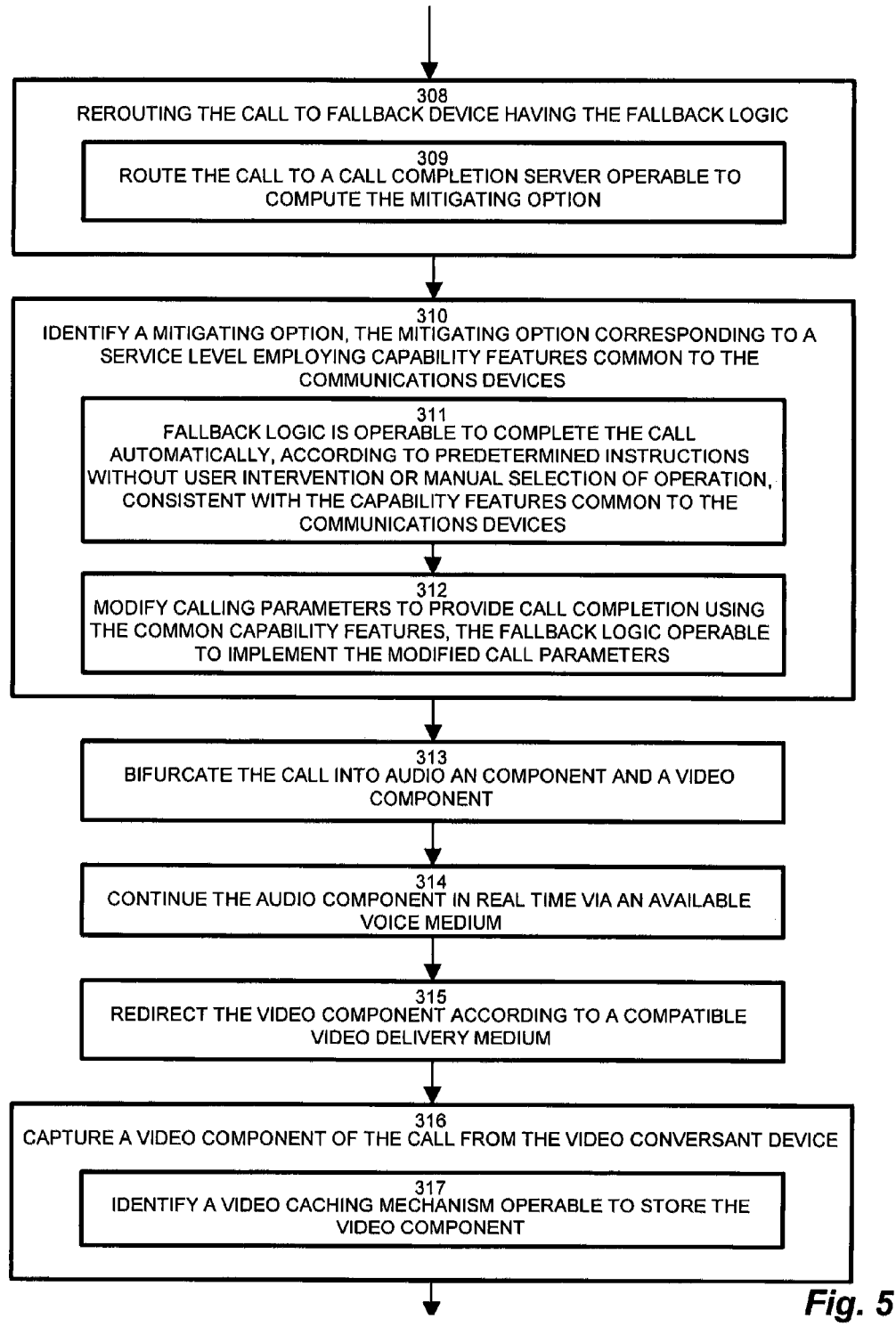
Figure 6:
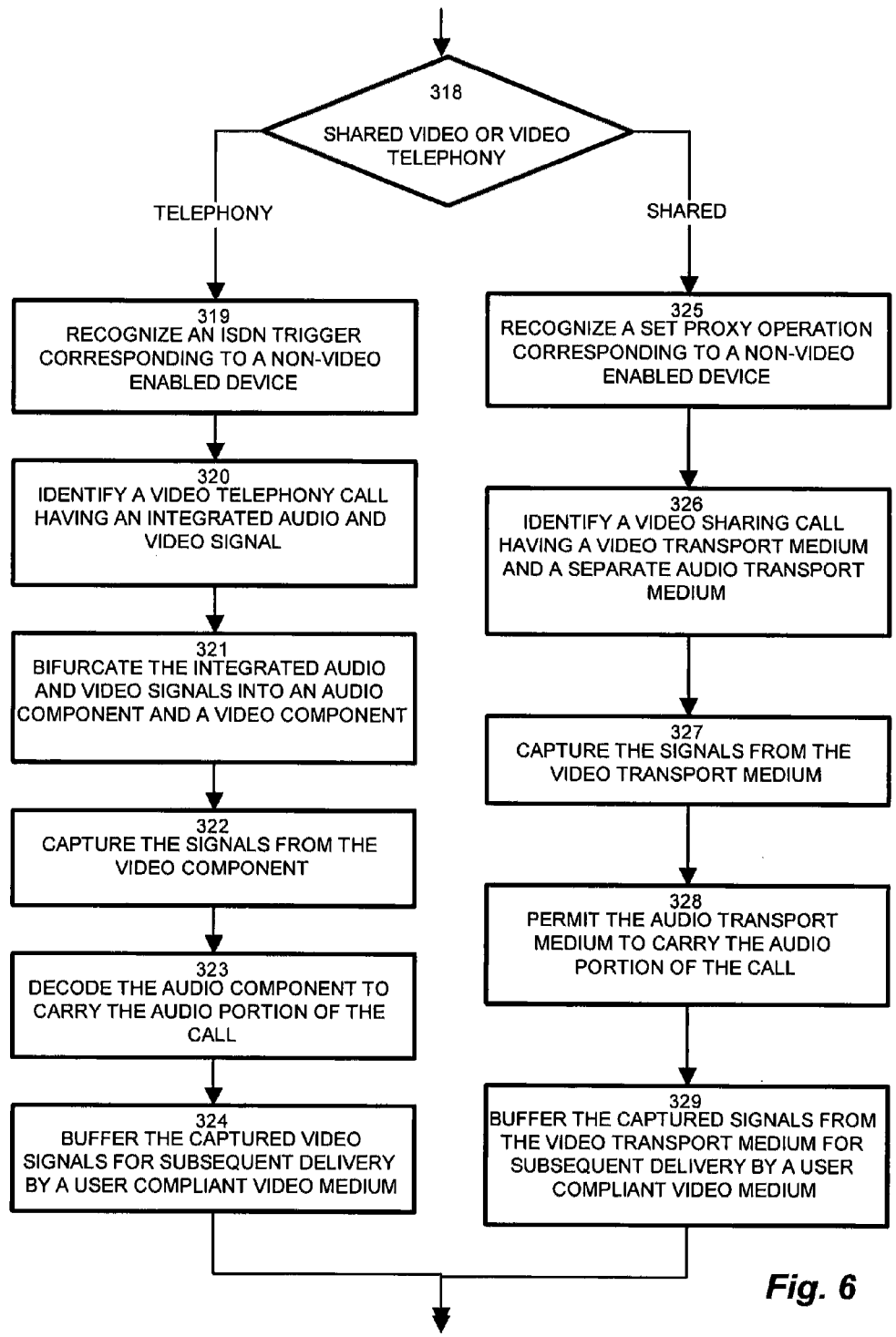
Figure 7:
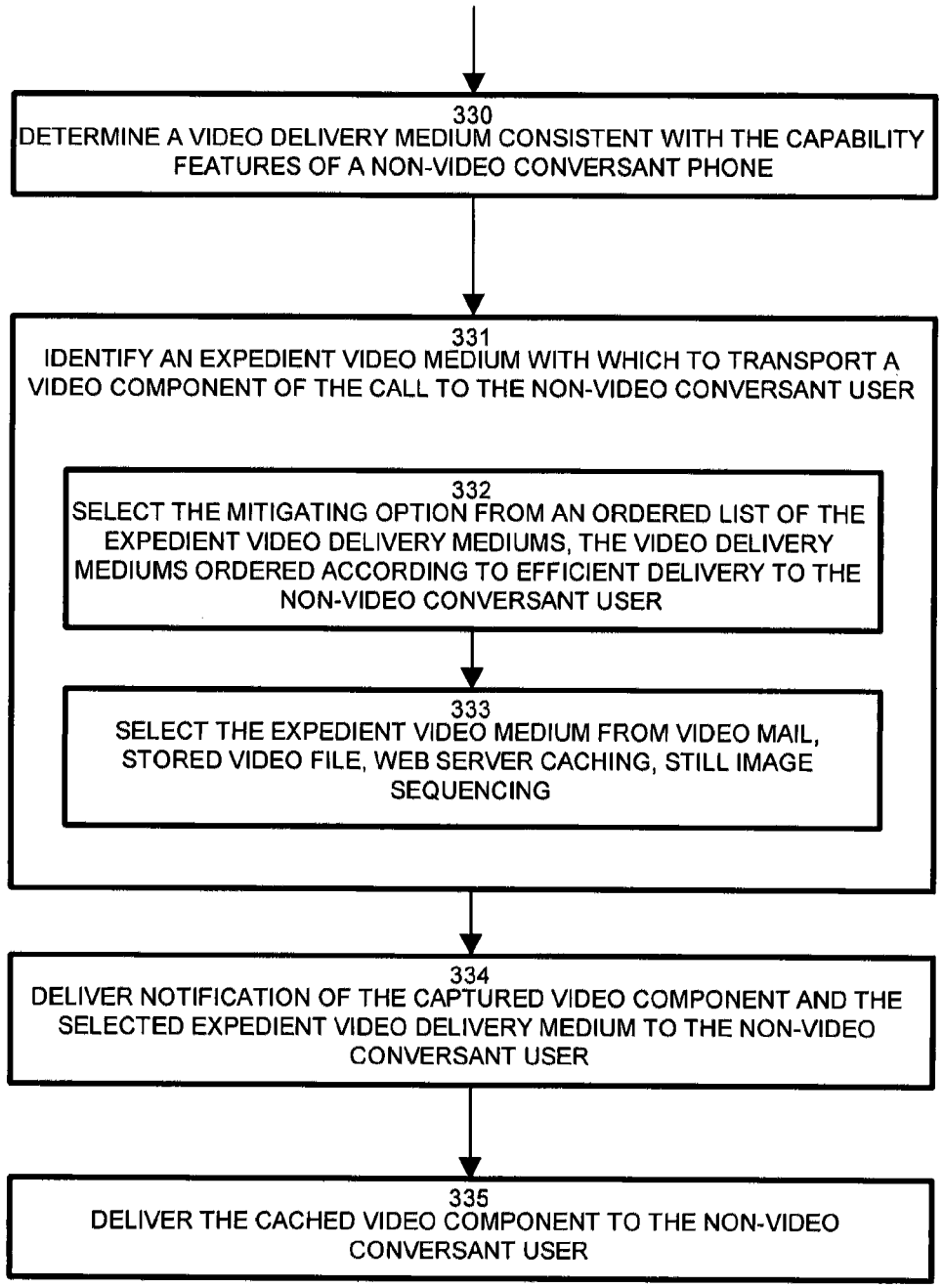

FIGS. 4-7 are a flowchart of video call fallback processing according to the diagram of FIG. 3. Referring to FIGS. 3 and 4, in the case of a video-based call such as with a video telephony or shared video enabled phone, the network 110 carrying the call determines a set of capability features of communications devices 102, in which the communications devices 102 include an initiating device 112 and a receiving device 114, such that the capability features are indicative of a service level of each of the communications devices, as depicted at step 300. Similar to the scenario above, the network 110 receives an incoming call from the initiating device 112, in which the incoming call has an expected service level, and the call is directed to the receiving device 114, as disclosed at step 301. The network 110, upon realizing the eminent call failure, compares the capability features of the initiating device 112 and the receiving device 114, as depicted at step 302, by traversing the capability features of each of the communication devices 102, as shown at step 303. In the network, the devices 102 are generally supported by specific carriers, or operators, which provide an operation or function to query and identify capabilities 112-1, 114-1 of the various devices 102.

Based on a comparison of the capabilities 112-1, 114-1 or other attempts by the network 110 to complete the call, one of the communication devices 102 is identified as a non-video conversant device, as shown at step 304. Thus, the fallback logic 132 concludes that an insufficiency exists between the capability features of the calling devices, the insufficiency resulting in an inability to complete the call at the expected service level, as depicted at step 305. As is known in the industry, call failure due to devices 102 inoperable for the requested service level initiates a trigger or proxy to take terminate the call. In contrast to such conventional approaches, configurations herein employ a trigger, set proxy or other call failure mechanism to invoke fallback logic 132 operable to complete the call at a service level common to the set of capability features of the communications devices, as shown at step 306.

The invoked fallback logic 132 in the fallback server 130 intercepts the incoming call 140, as depicted at step 307, and reroutes the call to fallback device 130 having the fallback logic 132, as disclosed at step 308. In this manner, the fallback server 130 operates as a network switch 120, for routing the call 124 to a call completion server 120 operable to compute a mitigating option 160 and allow the call to complete, as shown at step 309.

The fallback logic 132 identifies a mitigating option 160, such that the mitigating option 160 corresponds to a service level employing capability features 112-1, 114-1 common to the communications devices 102, as shown at step 310. The fallback logic 132 is therefore operable to complete the call automatically, according to predetermined instructions without user intervention or manual selection of operation, consistent with the capability features 112-1. 114-1 common to the communications devices 102, as disclosed at step 311. Typically, this would involve downgrading the video call to a voice call. The fallback server 130 modifies calling parameters to provide call completion using the common capability features, in which the fallback logic is operable to implement the modified call parameters, as depicted at step 312.

In the example shown in FIG. 3, involving a video call, the determined mitigating option includes bifurcating the call 140 into an audio component 142 and a video component 144, as depicted at step 313, and continues the audio component 142 in real time via an available voice medium, as depicted at step 314. The fallback server 130 simultaneously redirects the video component 144 according to a compatible video delivery medium, as shown at step 315.

The fallback logic 132 captures the video component 144 of the call from the video conversant device 112, as shown at step 316, and identifies a video caching mechanism operable to store the video component 144, such as the video repository 150, as depicted as step 317. The video repository 150 may represent a variety of caching options, depending on the capability features of the recipient device 114 such as a video mailbox, a video file (.flv) for subsequent emailing, or a text/email indicative of a URL if the recipient device 114 does not have a video display. Depending on the computed delivery mechanism, the video component is delivered either directly as a user compliant video medium 146-1 . . . 146-2

(146, generally) to the communications device 114, shown by arrow 146-1, or indirectly, such as by an IP network 162 to a user device 164 having a browser 166 for URL receipt. The disclosed bifurcating and storage of the video component is employed as an example to illustrate buffering/storage as mitigating omitted functionality in a receiving device. Alternatively, voice only, or the entire video and audio communication stream may be stored and retrieved later by the called party.

The bifurcated call 140 may take a variety of expected service levels 141, and depending on the initiated call, the mitigating option may be computed. In the example shown, a check is performed, at step 318, to identify if the call 140 is a video telephony or shared video call. If the call is a video telephony call, then concluding that an insufficiency exists further comprises recognizing an ISDN trigger corresponding to a non-video enabled device, as depicted at step 319, thus identifying a video telephony call having an integrated audio and video signal, as shown at step 320. The fallback server 130 bifurcates the integrated audio and video signals in the incoming call 144 into an audio component 142 at the mitigated service level 143 (i.e. voice only) and a video component 144 for fallback server 130 processing, as disclosed at step 321. The fallback server 130 captures the signals from the video component, as depicted at step 322, and decodes the audio component 142 to carry the audio portion of the call. The audio portion continues as with a conventional voice call, while the video signals from the video conversant device 112 continue and are captured as the video component 144 by the fallback server 130. The video repository 150 buffers the captured video signals for subsequent delivery by a user compliant video medium 146, as computed by the fallback server 130.

In conventional arrangements, when a 3G-324M Video Call is initiated by a user, if the far-end user is incapable of participating in a Video Call, the call typically fails or, potentially, is downgraded to a voice call. With Video Telephony Fallback, the video call is routed to a Video Telephony Service Node (VTSN). The VTSN terminates the 3G-324M call and allows the initiating user to leave a video for the called party. Depending upon known or inferred called party capabilities, the VTSN either records the video content and forwards it as an MMS or email message or the VTSN sends an SMS, IM or email that contains an RTSP or HTTP link to the Video content. If notification is by sending an SMS, IM or email with a link, the message can be sent immediately without waiting for the full video to be recorded.

As an alternative, the VTSN can terminate the 3G-324M call and immediately establish a voice call to the called party. If that is successful, the VTSN can act as a gateway adapting the voice portion of the calling party's 3G-324M call to the voice call with the called party and vice versa, while providing default video to the calling party and recording the video from the calling party for forwarding as described above. In this case, the VTSN should incorporate interactive voice and video response (IVVR) and interactive voice response (IVR) capabilities, as it is useful to provide a short IVVR session with the calling party and a short IVR session with the called party to explain what is happening before the through voice session is connected. Alternately, the through voice session can be connected, but a voice explanation can be injected into the voice paths in both directions.

In the case of a video sharing call 140, concluding that an insufficiency exists recognizing a set proxy operation corresponding to a non-video enabled device, intercepting the network 110 call failure processing, as depicted at step 325. The fallback processing identifies the call 144 as a video sharing call having a video transport medium and a separate audio transport medium, as disclosed at step 326. The fallback server 130 capturing the signals 144 from the video transport medium, as depicted at step 327. The fallback logic 132 permits the audio transport medium to carry the audio portion of the call 142, as shown at step 328, while buffering the captured signals 144 from the video transport medium for subsequent delivery by a user compliant video medium 146. Video Share Fallback provides similar service for subscribers with 3G Video Sharing service when they attempt to share with users whose handsets are not video share compatible. 3G video sharing is typically implemented using the SIP protocol, either with conventional SIP infrastructure or with IMS (the IP Multimedia System defined by the 3GPP).

As with video telephony fallback, a video share session that would otherwise fail is diverted (by a SIP proxy, a session border controller, an IMS CSCF or other IMS gateway function) to the Video Telephony Service Node (VTSN) where the video share is terminated and the video is buffered for subsequent delivery to the called party. Depending upon known or inferred called party capabilities, the VTSN either, records the video content and forwards it as an MMS or email message, or the VTSN sends an SMS, IM or email that contains an RTSP or HTTP link to the Video content. If notification is by sending an SMS with a link, the message can be sent immediately without waiting for the full video to be recorded.

Following call completion, the fallback server 130 identifies an available video delivery medium 146 based on the capability features 114-1 of the non-video conversant device 114, thus determining a video delivery medium consistent with the capability features of a non-video conversant phone, as depicted at step 330. From among multiple possible available mediums 146 (i.e. email is almost always an option, although may be less desirable than more direct mechanisms), the fallback logic 132 attempts to identify an expedient video medium with which to transport a video component of the call to the non-video conversant user, as disclosed at step 331. This includes selecting the mitigating option from an ordered list of the expedient video delivery mediums 160, in which the video delivery mediums are ordered according to efficient delivery to the non-video conversant user 114, as disclosed at step 332. In the example arrangement, this may include selecting the expedient video medium from video mail, stored video file, web server caching, still image sequencing, as disclosed at step 333. The fallback server 132 then delivers notification of the captured video component 146 and the selected expedient video delivery medium to the non-video conversant user 114, as shown at step 334 This notification is particularly important in the case of, for example, an email of a distinct web server (page) from which the vide component 146 may be retrieved. The fallback server 130 then delivers the cached video component 146 from the repository 150 to the non-video conversant user 114, as depicted at step 334. The notification and video component 146-1 may be the same communication if a video delivery is made directly to the recipient device 114.

Further configurations employ a variety of additional factors in determining the mitigating option for delivery. This determination is based on any or all of the following information:

subscriber data the operator has about the called party (typically when the called party is a subscriber on the operator's network).

called party information from the calling party, for example, data about the called party that is stored in the phonebook on the calling party's handset or in a network copy of that phonebook held on behalf of the calling party.

previous experience delivering multimedia content to this called party.

information obtained from failed attempts to establish the original communications, for example what network the called party is on, where they are located and/or what kind of service(s) they have (e.g. their IP address is on a mobile network versus an IP address from a fixed broadband Internet service provider). This class of information is typically available from switches, softswitches, Intelligent Network service control points, SIP proxies, session border controllers and other elements that participate in establishing a multimedia communications session.

information obtained from the failure of other alternate delivery means.

other information about the called party that may become available to the operator providing fallback video communications.

initiating alternate delivery means either immediately (as buffering begins) or once buffering is complete.

storing the video or multimedia content until delivery is compete (or until some holding period has expired).

maintaining records of called parties including which delivery means worked and which didn't and how rapidly they worked.

performing other useful functions as a result of knowing a fallback communications event has occurred, in parallel with or after fallback video communications attempts have been initiated or have succeeded or failed, such as:

Direct marketing including sending targeted text or multimedia messages to recent called parties and calling parties. The principal idea is to promote further adoption of video communications equipment and services so that future communications can proceed directly without the need for fallback video communications. Of course, this marketing channel can be used for other purposes as well, e.g. when the called party's location (perhaps in a country with no mobile video services) indicates they are not a candidate for mobile video services, it may still make sense to promote Internet video equipment or specific country-to-country voice calling plans, Such direct marketing include sending messages (voice, text or multimedia) to called parties describing how the recent video could have been received live if they had the appropriate handset or service and then making them an offer of the appropriate device and/or service. It also includes delivering messages to calling parties, telling them that their video was (or was not) delivered by alternate means and, if they talk their friend into signing up within the next N days, they get a commission (extra minutes, extra service, cash back, etc.).

Sending alerts. If the called party should have been able to receive the communication but didn't, for example, if the called party is an always open call center or a public safety answering point, Sending billing information to a billing system or a third party.

analyzing records of calls and call completions and cross-correlating them with other subscriber and non-subscriber data sources for diverse purposes including measuring service performance, designing products and marketing programs, for example that seek to increase service adoption.

Those skilled in the art should readily appreciate that the programs and methods for avoiding call failure through fallback processing as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for avoiding call failure has been particularly shown and described with references to embodiments thereof, it will be understood by those skilled in the art that various changes in form and details may be made therein without departing from the scope of the invention encompassed by the appended claims.

What is claimed is:

1. A method of avoiding call failure, comprising:
    determining a set of capability features of communications devices, the communications devices including an initiating device and a receiving device, the capability features indicative of a service level of each of the communications devices;
    receiving an incoming call from the initiating device, the incoming call having an expected service level, the call directed to the receiving device;
    concluding that an insufficiency exists between the capability features of the calling devices, the insufficiency resulting in an inability to complete the call at the expected service level, concluding that an insufficiency exists further comprising:
        recognizing an ISDN trigger corresponding to a non-video enabled device;
        identifying a video telephony call having an integrated audio and video signal;
        bifurcating the integrated audio and video signals into an audio component and a video component;
        capturing the signals from the video component;
        decoding the audio component to carry the audio portion of the call; and
        buffering the captured video signals for subsequent delivery by a user compliant video medium; and
    invoking fallback logic operable to complete the call at a service level common to the set of capability features of the communications devices.

2. The method of claim 1 wherein the fallback logic is operable to complete the call automatically, according to predetermined instructions without user intervention or manual selection of operation, consistent with the capability features common to the communications devices.

3. The method of claim 1 wherein invoking the fallback logic further comprises:
    identifying a mitigating option, the mitigating option corresponding to a service level employing capability features common to the communications devices; and
    modifying calling parameters to provide call completion using the common capability features.

4. The method of claim 3 wherein modifying calling parameters further comprises:
    intercepting the incoming call; and
    rerouting the call to fallback device having the fallback logic, the fallback logic operable to implement the modified call parameters.

5. The method of claim 3 wherein identifying the mitigating option further comprises:
 traversing the capability features of each of the communication devices;
 identifying one of the communication devices as a non-video conversant device; and
 identifying an available video delivery medium based on the capability features of the non-video conversant device.

6. The method of claim 5 further comprising:
 identifying a video caching mechanism operable to store the video component; and
 delivering the cached video component to the non-video conversant user.

7. The method of claim 5 further comprising:
 bifurcating the call into audio an component and a video component;
 continuing the audio component in real time via an available voice medium;
 determining a video delivery medium consistent with the capability features of a non-video conversant phone; and
 redirecting the video component according to a compatible video delivery medium.

8. The method of claim 5 wherein invoking the fallback logic further comprises:
 comparing the capability features of the initiating device and the receiving device; and
 identifying an expedient video medium with which to transport a video component of the call to the non-video conversant user.

9. The method of claim 8 further comprising:
 routing the call to a call completion server operable to compute the mitigating option;
 capturing a video component of the call from the video conversant device;
 selecting the mitigating option from an ordered list of the expedient video delivery mediums, the video delivery mediums ordered according to efficient delivery to the non-video conversant user;
 delivering notification of the captured video component and the selected expedient video delivery medium to the non-video conversant user.

10. The method of claim 9 further comprising selecting the expedient video medium from video mail, stored video file, web server caching and still image sequencing.

11. The method of claim 1 wherein concluding that an insufficiency exists further comprises:
 recognizing a set proxy operation corresponding to a non-video enabled device;
 identifying a video sharing call having a video transport medium and a separate audio transport medium;
 capturing the signals from the video transport medium;
 permitting the audio transport medium to carry the audio portion of the call; and
 buffering the captured signals from the video transport medium for subsequent delivery by a user compliant video medium.

12. The method of claim 1 further comprising completing the call at a service level common to the set of capability features of the communications devices.

13. A communications device for dynamically determining the service level of a call, comprising:
 a fallback server for determining a set of capability features of communications devices, the communications devices including an initiating device and a receiving device, the capability features indicative of a service level of each of the communications devices;
 an interface to a call network receiving an incoming call from the initiating device, the incoming call having an expected service level, the call directed to the receiving device; and
 fallback logic in the fallback server operable to conclude that an insufficiency exists between the capability features of the calling devices, the insufficiency resulting in an inability to complete the call at the expected service level, the fallback logic further operable to complete the call at a service level common to the set of capability features of the communications devices.

14. The device of claim 13 wherein the fallback logic is operable to complete the call automatically, according to predetermined instructions without user intervention or manual selection of operation, consistent with the capability features common to the communications devices, the fallback server further operable to
 identify a mitigating option, the mitigating option corresponding to a service level employing capability features common to the communications devices; and
 modify calling parameters to provide call completion using the common capability features.

15. The device of claim 14 wherein the fallback logic identifies the mitigating options by:
 traversing the capability features of each of the communication devices;
 identifying one of the communication devices as a non-video conversant device; and
 identifying an available video delivery medium based on the capability features of the non-video conversant device.

16. The device of claim 15 wherein the fallback logic is further operable to:
 identify a video caching mechanism operable to store the video component; and
 deliver the cached video component to the non-video conversant.

17. The device of claim 13 wherein the fallback server is further operable to:
 respond to an ISDN trigger corresponding to a non-video enabled device;
 identify a video telephony call having an integrated audio and video signal;
 bifurcate the integrated audio and video signals into an audio component and a video component;
 capture the signals from the video component;
 decode the audio component to carry the audio portion of the call; and
 buffer the captured video signals for subsequent delivery by a user compliant video medium.

18. The device of claim 13 wherein the fallback server is further operable to:
 recognize a set proxy operation corresponding to a non-video enabled device;
 identify a video sharing call having a video transport medium and a separate audio transport medium capture the signals from the video transport medium;
 permit the audio transport medium to carry the audio portion of the call; and
 buffer the captured signals from the video transport medium for subsequent delivery by a user compliant video medium.

19. The method of claim 13 wherein the fallback logic:
 bifurcates integrated audio and video signals in the incoming call into an audio component at the mitigated service level and a video component;
 captures the signals from the video component;

decodes the audio component to carry the audio portion of the call; and continuing transmitting the audio signals as a standard voice-only call.

20. The method of claim 19 wherein the fallback logic is operable to complete the call at a service level common to the set of capability features of the communications devices.

21. A computer program product having a computer readable medium operable to store a set of encoded instructions for execution by a processor responsive to the instructions for rendering image data associated with a user comprising:

computer program code for determining a set of capability features of communications devices, the communications devices including an initiating device and a receiving device, the capability features indicative of a service level of each of the communications devices;

computer program code for identifying an incoming call from the initiating device to the receiving device;

computer program code for determining that the call is about to fail;

computer program code for identifying a mitigating option, the mitigating option common to both the initiating device and the receiving device; and computer program code for modifying parameters of the call to complete the call employing the modified parameters.

22. The computer program product of claim 21 wherein the computer program code for identifying the mitigating option includes:

computer program code for identifying the parameters or the initiating device and the receiving device; and computer program code for computing a common feature upon which the call may be based for completion.

* * * * *